United States Patent [19]

Tsubouchi

[11] Patent Number: 4,639,181

[45] Date of Patent: Jan. 27, 1987

[54] PALLET EXCHANGE DEVICE

[75] Inventor: Yuzo Tsubouchi, Osaka, Japan

[73] Assignee: Tsubakimoto Chain Co., Osaka, Japan

[21] Appl. No.: 674,550

[22] Filed: Nov. 26, 1984

[30] Foreign Application Priority Data

Nov. 28, 1983 [JP] Japan ............................ 58-182078[U]
Nov. 28, 1983 [JP] Japan ............................ 58-182079[U]

[51] Int. Cl.⁴ .............................................. B66F 9/06
[52] U.S. Cl. .................... 414/349; 414/389; 414/785
[58] Field of Search ............. 414/785, 349, 373, 609, 414/592, 389

[56] References Cited

U.S. PATENT DOCUMENTS 3,187,917 6/1985 Miller ............................ 414/592 X

FOREIGN PATENT DOCUMENTS 11561 1/1977 Japan .................................. 414/785

Primary Examiner—Robert J. Spar
Assistant Examiner—Stuart J. Millman
Attorney, Agent, or Firm—Dann, Dorfman, Herrell & Skillman

[57] ABSTRACT

For use with a fork lift truck having a pair of vertically spaced apart forks which are raised or lowered in union, apparatus for exchanging a loaded or unloaded pallet with an unloaded or loaded pallet, respectively, by back and forth movement of the fork lift truck and by vertical movement of the forks. The apparatus comprises a pallet supporting member which is biased under the force of a spring so as to move to an extended pallet supporting position from a retracted position out of a path of pallets carried by the forks; a lever which is located at a position higher than said pallet supporting member; and a connecting member which is formed with elongated slots into which are fitted said lever and said pallet supporting member, said connecting member being raised by upward movement of an unloaded pallet engaging the lever to incline it upwardly, the connecting member retracting the pallet supporting member and latching it. When said lever is inclined downwardly by downward movement of a loaded pallet, the pallet supporting member is unlatched and returned to said pallet supporting position. When the forks go down further, the loaded pallet which was on the upper fork of the truck is left on the supporting member and only an unloaded pallet is now on the lower fork of the truck.

10 Claims, 13 Drawing Figures

FIG. 3
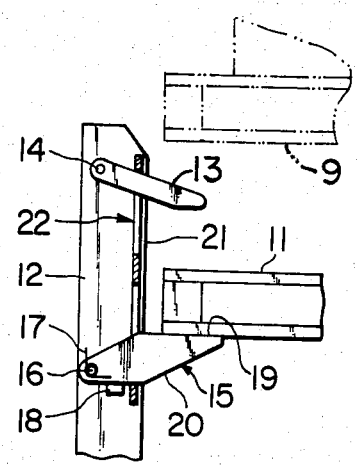
FIG. 4A
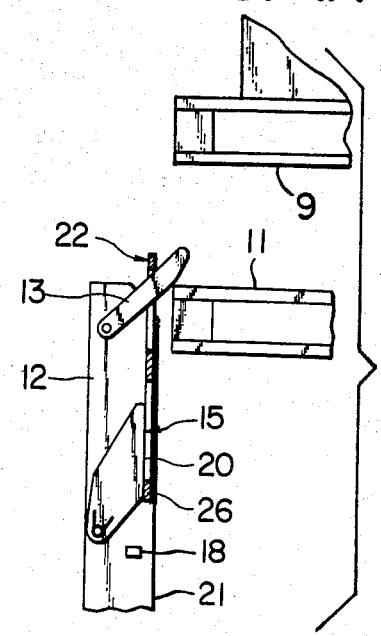
FIG. 4B
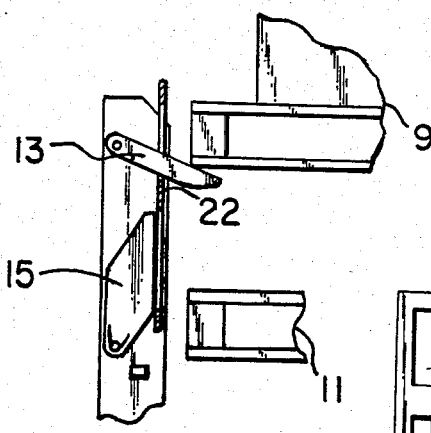
FIG. 5
FIG. 4C
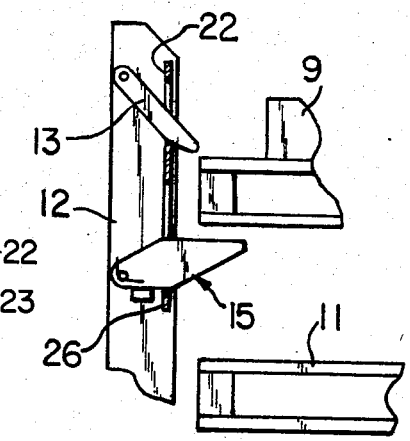

PALLET EXCHANGE DEVICE

BACKGROUND OF THE INVENTION

1. Field of the Invention

The present invention relates to a pallet exchange device adapted to exchange a loaded or unloaded pallet with an unloaded or loaded pallet, respectively, by the forward and backward movement of a remote-controlled fork lift truck and by the vertical movement of forks thereof.

2. Description of the Prior Art

So far when a loaded or unloaded pallet carried by a remote-controlled fork lift truck is replaced with an loaded or unloaded pallet, a loaded or unloaded pallet 3 carried by a fork 2 of a remote-controlled fork lift truck 1 is left on an unloading stand 4 by a series of operations consisting of first moving a fork lift truck backward (that is, upward in FIG. 1), lowering the fork 2 and then moving the fork lift truck 1 forward (that is, downward in FIG. 1). Thereafter, the fork lift truck 1 is shifted to the left in FIG. 1 and then moved backward. Next the fork 2 is raised so that the fork 2 carries an unloaded or loaded pallet 5.

The fork lift truck 1 must be moved forward and backward twice and shifted laterally twice. As a consequence, a pallet exchange time cycle is long and additional spaces where loaded and unloaded pallets are stacked are needed. In addition, in the case of a remote-controlled fork lift truck, a lateral movement means for shifting the fork lift truck laterally is needed. As a result, the conventional pallet exchange devices have economical disadvantages in respect to floor space and equipment.

SUMMARY OF THE INVENTION

In view of the above, a first object of the present invention is to provide a pallet exchange device which can substantially overcome the defects encountered in the conventional pallet exchange devices which can replace a loaded pallet with an unloaded pallet by only one backward and forward movement of a fork lift truck and by vertical movement of forks thereof. To the above and other ends, the present invention provides a pallet exchange device of the type which employs a pair of vertically spaced apart forks of a fork lift truck which are raised or lowered in unison. A loaded pallet carried by the upper fork is unloaded while an unloaded pallet is carried by the lower fork. The invention is characterized in that a device has one pallet supporting member which is biased under the force of a spring so as to move to a pallet supporting position from a retracted position outside of a path of travel of a pallet carried by a fork, and a lever which is located at a position higher than said pallet supporting member by a height less than the vertical distance of said pair of vertically spaced apart forks and is adapted to move into or out of said path of travel. A member and a lever are pivotably fixed to each of four stationary upright members disposed on both sides of said path of travel of a pallet carried by said fork. A connecting member which is formed with elongated slots into which are fitted said lever and said pallet supporting member, respectively, is vertically slidably guided by each stationary member; said connecting member is raised when said lever is engaged by an unloaded pallet and is caused to incline upwardly. The connecting member elevates said pallet supporting member to said retracted position at which point the connecting member presses against said pallet supporting member so as to cause the number to latch and remain at a raised position; and when said lever is displaced downwardly by a loaded pallet, the connecting member is moved down so that said pallet supporting member is unlatched so as to return to said pallet supporting position.

A second object of the present invention is to provide a pallet exchange device in which an unloaded pallet carried by a fork lift truck is replaced with a loaded pallet only by one forward and backward movement of the fork lift truck and by vertical movement of forks thereof. To the above and other ends, the present invention provides a pallet exchange device of the type which employs a pair of vertically spaced apart forks of a fork lift truck. An unloaded pallet is carried by the lower fork and is unloaded while a loaded pallet is loaded onto the upper fork. A pallet supporting member is pivotably fixed to each of a plurality of stationary upright members disposed on both sides of the path of movement of a pallet carried by a fork in such a way that said pallet supporting member is biased to rotate from a retracted position outside of said path of the pallet into a pallet supporting position within said path.

The above and other objects, effects, features, and advantages of the present invention will become more apparent from the following description of preferred embodiments thereof taken in conjunction with the accompanying drawings.

BRIEF DESCRIPTION OF THE DRAWINGS

FIGS. 2-5 show a first embodiment of the present invention when a loaded pallet carried by a fork lift truck is exchanged with an unloaded pallet;

FIG. 2 is a schematic side view thereof;

FIG. 3 is a fragmentary side view at an enlarged scale, illustrating how an unloaded pallet in full lines is supported before the exchange, and showing in broken lines how the loaded pallet is positioned by the fork lift above the unloaded pallet;

FIGS. 4A, 4B and 4C are fragmentary views at an enlarged scale illustrating the sequence of steps in replacing the unloaded pallet with a loaded pallet.

FIG. 5 is a face view of a connecting member;

FIG. 9 is a schematic side view thereof;

FIGS. 10 and 11 are fragmentary side views, on enlarged scale, illustrating how an unloaded pallet is exchanged with a loaded pallet.

DESCRIPTION OF THE PREFERRED EMBODIMENTS

Figure 1:
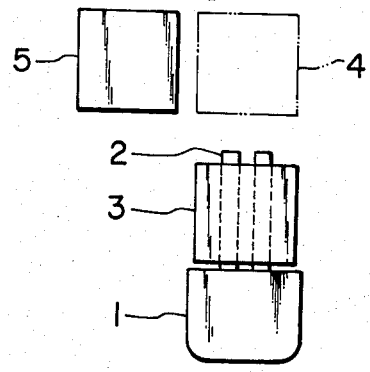
FIG. 1 is a top view used to explain a conventional pallet exchange method.
Figure 2:
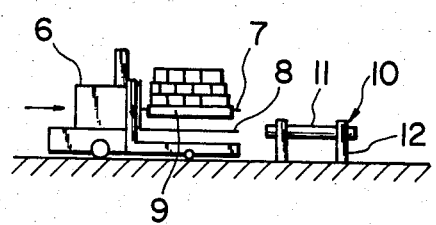

A first embodiment of the present invention will be described. Referring first to FIG. 2, a pair of vertically spaced apart forks 7 and 8 which are adapted to be raised or lowered in unison are mounted on the rear of a fork lift truck 6. The upper fork 7 carries a loaded pallet 9. A pallet exchange device generally indicated by the reference numeral 10 in accordance with the present invention is disposed at a position at which a loaded pallet is unloaded and has four stationary columns 12 square in cross section so as to support the right and left sides of a pallet in the direction which a fork is inserted into an unloaded pallet 11.

As best shown in FIGS. 3-5, a lever 13 is pivoted with a pin 14 at the upper portion of each column 12 in such a way that the lever 13 moves on the pin 14 in a vertical plane and can engage with the side edge of an unloaded pallet when the latter is raised. A pallet supporting member 15 is also pivoted with a pin 16 to the column 12 and is spaced apart from the lever 13 vertically downward by a suitable distance which is less than the vertical distance between the forks 7 and 8. In the extended position shown in FIG. 3, the supporting member 15 has a horizontal upper surface 19 which supports the unloaded pallet 11 when the supporting member 15 is pressed against a stop element 18 under the force of a spring 17, and a lower inclined surface 20. When the supporting member 15 is rotated in the counterclockwise direction so that the lower inclined surface 20 is disposed in a vertical position, the lower inclined surface 20 is in a position which is slightly spaced inwardly from the inner surface 21 of the column 12 inwardly (see FIGS. 4A and 4B).

A connecting member 22 in the form of a plate is vertically slidably supported and guided in the vicinity of and along the inner surface 21 of the column 12 and the lever 13 is extended through an upper elongated slot 23 of the connecting member 22 while the supporting member 15 is extended through a lower elongated slot 24. The connecting member 22 is in engagement with the lever 13 so that the connecting member 22 is supported by the lever 13. In this case, the lever 13 is biased upwardly with the force of a spring or the like designed and constructed so that the lever 13 is inclined downwardly by about 30° relative to the horizontal when the lever 13 is engaged with the connecting member 22 in its lower limit position illustrated in FIG. 3. As will be described hereinafter, when the unloaded pallet 11 is raised so as to push the lever 13 upward, the connecting member 22 is also raised in unison so that the lower edge 25 of the lower vertically elongated slot 24 (see FIG. 5) first engages with the supporting member 15 and then rotates the supporting member 15 in the counterclockwise direction against the force of spring 17. When the lower inclined surface 20 of the supporting member 15 is brought to the vertical position, the lower portion 26 of the connecting member 22 moves upwardly into engagement with the lower inclined surface 20 as indicated in FIGS. 4A and 4B so that the lower portion 26 and the lower inclined surface 20 are pressed against each other under the force of the spring 17 and the frictional force is produced to thereby latch the supporting member 15 in its elevated position out of the path of movement of the pallet 11 so that it may be lowered past the member 15, as shown in FIG. 4B. As a consequence, even after the unloaded pallet 11 is lowered away from the lever 13, the connecting member 22 remains in the raised position and the lever 13 remains in an intermediate position in the upper vertically elongated slot 23 of the connecting plate 22.

When the loaded pallet 9 carried by the fork lift truck 6 is exchanged with an unloaded pallet 11, the unloaded pallet 11 is first positioned on the supporting members 15 of the pallet exchange device 10 and then the fork lift truck 6 is moved backwardly so that the lower fork 8 is inserted into the unloaded pallet 11. In this case, the loaded pallet 9 is located above the levers 13. Thereafter both the forks 7 and 8 are raised so that the unloaded pallet 11 engages with the levers 13 and causes them to incline upwardly while the connecting members 22 cause their respective supporting members 15 to rotate in the counterclockwise direction or upwardly. When the lower inclined surface 20 of the supporting members 15 are brought to the vertical positions and are engaged with the lower portions 26 of the connecting members 22, the lift of the forks 7 and 8 is stopped. Thereafter, the forks 7 and 8 are lowered so that the unloaded pallet 11 is lowered below the supporting members 15, the loaded pallet 9 engages with the levers 13 and causes them to incline downwardly as shown in FIG. 4C or to rotate in the clockwise direction within the slot 23. When the levers engage the bottoms of the slots, further movement lowers the connecting members 22 so that their lower portions 26 are released from the lower inclined surfaces 20 of the supporting members 15 to unlatch the members. As a result, the supporting members 15 are lowered under the bias of the springs 17 and engage with the stop elements 18 and the upper horizontal surfaces 19 of the supporting members 15 are in position in the path of movement of the pallets to support the loaded pallet 9. Thereafter the fork lift truck 6 is moved forward so that the loaded pallet 9 is released from the fork 7 and remains on the pallet exchange device 10 while the unloaded pallet 11 is supported by the fork 8 and is moved out of the pallet exchange device 10.

Figure 6:
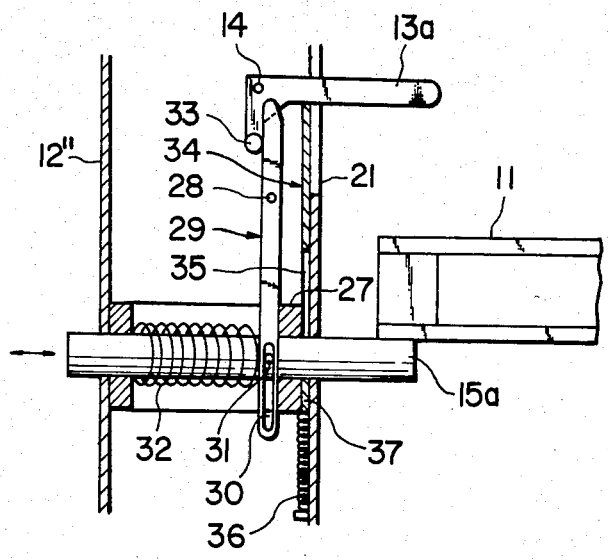
FIGS. 6, 7 and 8 are views similar to FIGS. 3, 4 and 5, but illustrate a modification of the first embodiment.
Figure 7:
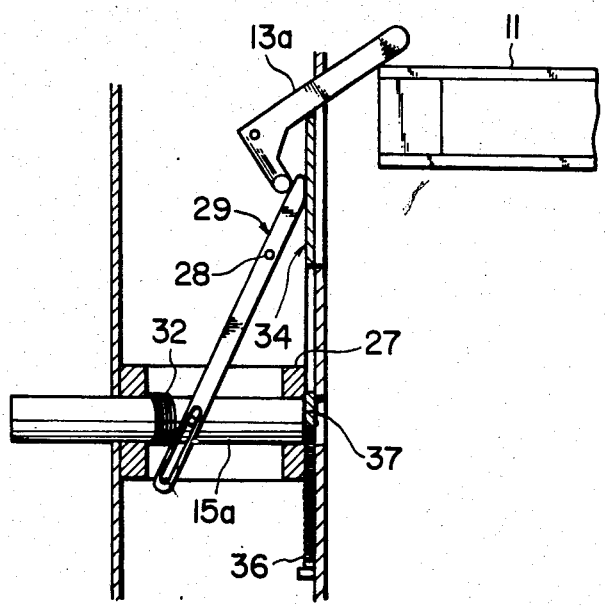

Referrring next to FIGS. 6 and 7, a modification of the present invention will be described. An unloaded-pallet supporting member 15a is horizontally slidably supported and guided by a bifurcated guide block 27 which in turn is securely fixed to a column 12". A connecting rod 29 is pivoted with a pin 28 to the column 12" at a position above the supporting member 15a and has an elongated slot 30 which is formed at the lower end portion of the connecting rod 29 and into which is slidably fitted a pin 31 extended from the supporting member 15a. A coiled spring 32 is fitted over the supporting member 15a between the left-hand part of the guide block 27 and the connecting rod 29 so that the connecting rod 29 is normally biased against the right-hand part of the guide block 27 (See FIG. 6) and consequently the supporting member 15a is normally biased to extend into the path of movement of the pallets in an unloaded-pallet supporting position.

Figure 8:
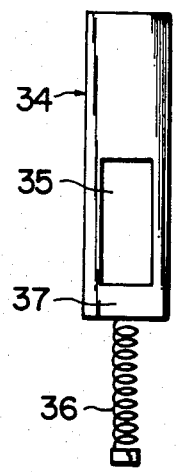

An L-shaped lever 13a is bent at its pivot pin 14 and has a horizontal bar 33 which is attached to the lower end of the L-shaped lever 13a and is biased into engagement with the upper end of the connecting rod 29. An intermediate plate 34 is vertically slidably interposed between the inner surface 21 of the column 12 and the right-hand part of the guide block 27. As best shown in FIG. 8, the intermediate plate 34 has an elongated slot 35 into which is fitted the supporting member 15a. The lower edge of the elongated slot 35 of the intermediate plate 34 is normally engaged with the supporting member 15a under the force of a spring 36. Under these conditions, the upper end of the intermediate plate 34 engages with the undersurface of the lever 13a so that the L-shaped lever 13a (that is, the longer arm portion thereof) is maintained horizontal.

As in the case of the first embodiment, when the fork 8 is raised so that an unloaded pallet 11 is raised into engagement with the lever 13a so that the 13a is caused to incline upwardly, the horizontal bar 33 of the L-shaped lever 13a causes the connecting rod 29 to rotate in the clockwise direction so that the supporting member is retracted against the spring 32. When the leading end of the supporting member 15a is pulled out of the elongated slot 35 of the intermediate plate 34, the intermediate plate 34 is forced upwardly under the force of the spring 36 so that the lower portion 37 of the intermediate plate 34 engages with the leading end of the supporting member 15a, whereby the supporting member 15a is held stationary and latched in the retracted position out of the path of movement of the pallet to permit the pallet 11 to be lowered. When the forks 7 and 8 are lowered so that the unloaded pallet 11 is lowered below the level of the supporting member 15a, the loaded pallet above the empty pallet 11 thereafter pushes lever 13a downward so that the intermediate plate 34 is also lowered past the position shown in FIG. 6. When the lower portion 37 of the intermediate plate 34 is released from the leading end of the supporting member 15a, unlatching the members 15a, they displace the connecting rods on their pivots 28 to the position of FIG. 6. The horizontal bar 33 moves to the left as the loaded pallet continues to pivot the lever 13a to a position out of the path of movement of the pallet. The spring 36 permits the plate 34 to move down with the lever 13a and releases the connecting rod 29. As a result, the supporting member 15a which was pushed forward under the force of the spring 32 is in the path of the loaded pallet and supports the loaded pallet which is lowered. When the loaded pallet moves past the lever 13a, the spring 36 returns the plate 34 to the position shown in FIG. 6. That is, in accordance with this modification, the connecting rod 29 and the intermediate plate 34 co-act with each other to accomplish the latching and unlatching function of the connecting member 22 of the first embodiment.

Figure 9:
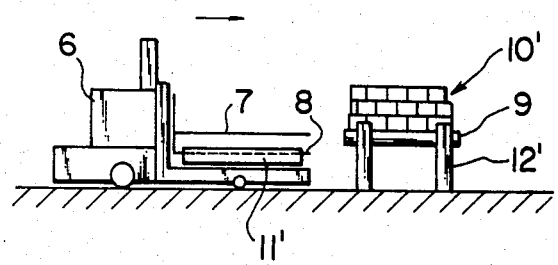
FIGS. 9, 10 and 11 are views used to explain a third embodiment of the present invention when an unloaded pallet carried by a fork lift truck is exchanged with a loaded pallet.

Next a third embodiment of the present invention will be described. Referring first to FIG. 9, a fork lift truck 6 is provided with a pair of vertically spaced forks 7 and 8 which are raised or lowered in unison with each other. The upper fork 7 carries the loaded pallet 9. A pallet exchange device 10' of this embodiment of the present invention is disposed at a position where the loaded pallet 9 is unloaded and has four stationary columns 12' for supporting the right and left sides of a pallet in the direction in which a fork is inserted into the pallet.

Figure 10:
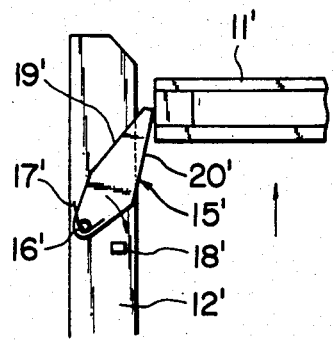
Figure 11:
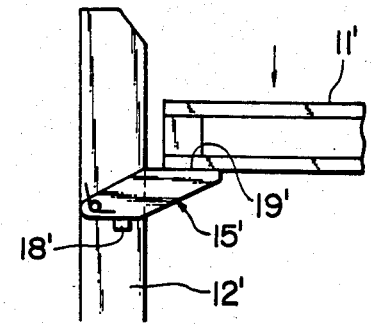

As shown in FIGS. 10 and 11, a supporting member 15' which supports the loaded pallet 9 is pivoted with a pin 16' to the upper portion of each column 12' in such a way that the supporting member 15' can swing in a vertical plane. The supporting member 15' is normally pressed against a stop element 18' under the force of a spring 17'. Under these conditions, the loaded pallet 9 is supported on the horizontal surface 19' of the supporting members 15'.

When the fork lift truck 6 whose lower fork 8 carries an unloaded pallet 11' is moved backward as indicated by an arrow in FIG. 9 so that the upper fork 7 is inserted into the loaded pallet 9 and thereafter when the forks 7 and 8 are raised, the loaded pallet 9 is loaded on the fork lift truck 6. In this case, an unloaded pallet 11' engages with the lower inclined surface 20' of the supporting member 15' so that the supporting member 15' is rotated in the counterclockwise direction or upwardly (See FIG. 10). When the unloaded pallet 11' passes the leading or front ends of the supporting members 15', the supporting members 15' are rotated in the clockwise direction or downwardly and engage with the stop elements 18'. Thereafter, the forks 7 and 8 are lowered so that the unloaded pallet 11' is placed upon the supporting members 15' (See FIG. 11). When the fork lift truck 6 is moved forward, the empty pallet 11' remains on the pallet exchange device 10' while the loaded pallet 9 is carried by the fork lift truck 6.

As described above, according to the present invention, it only suffices that the fork lift truck moves forward or backward when an unloaded pallet carried by the fork lift truck is exchanged with a loaded pallet stacked on the pallet exchange device. Thus, lateral movement means and a space therefor can be eliminated. This effect is particularly advantageous when a remote-controlled fork lift truck which is controlled by a remote control unit is driven for effecting the automatic pallet exchange so that the present invention is remarkably advantageous in labor saving in a factory or in full automation of a factory.

What is claimed is:

1. A pallet exchange device for use with a fork truck having a pair of vertically spaced apart forks which are raised and lowered in unison, said device comprising a plurality of upright stationary members defining therebetween a vertical path of movement for loaded and unloaded pallets, pallet supporting members mounted on said stationary members for movement between extended positions in said path of movement at a common level for supporting one of said pallets, and a retracted position out of said path, said supporting members being biased toward said extended positions, levers located at a position higher than the level of said pallet supporting members by a distance less than the vertical spacing between said pair of forks, said levers being mounted on said stationary members and each having a part to be displaced into or out of said path, connecting means having a plate for each supporting member, said plate being vertically guided by a stationary member, said connecting means adapted to engage both said levers and said supporting members so as to be displaced when said lever parts are engaged by a pallet being raised by the lower of said pair of forks and caused to move upwardly, and operable to displace said pallet supporting members to their retracted positions and latch said supporting members so that they remain in said retracted positions, said lever parts when moved downwardly by a pallet being lowered by the upper of said pair of forks, displacing said connecting means to unlatch said supporting members and allow them to return to their extended positions.

2. A device according to claim 1 wherein each of said pallet supporting members is pivotally mounted on said stationary member, said stationary members having a stop element to position each of said supporting member in its extended position and spring means to bias said supporting member toward said stop element.

3. A device according to claim 1 wherein each plate of said connecting means has a pair of slots to receive said lever and said supporting member respectively, the slots being dimensioned so that when the lever part is moved upwardly, the lower slot latches said supporting member in its retracted position.

4. A device according to claim 3 wherein each of said pallet supporting members is slidably mounted on said stationary member for axial displacement between said extended and retracted positions, and includes a spring biasing said supporting member to its extended position.

5. A device according to claim 4 wherein said connecting means includes a connecting rod operable to displace each supporting member against the bias of its spring into its retracted position when the lever part is moved upwardly by upward movement of a pallet in said path.

6. A device according to claim 5 wherein said plate of said connecting means has a slot to receive the supporting member when it is extended, said plate being displaced upon upward movement of said lever part to latch said supporting member when retracted by said connecting rod.

7. A pallet exchange device for use with a fork truck having a pair of vertically spaced apart forks to support a loaded pallet and to permit an unloaded pallet carried by the lower of said pair of forks to be exchanged with said loaded pallet which may be carried away by the upper of said pair of forks, said device comprising a plurality of upright stationary members disposed on both sides of a vertical path of movement of the pallets carried by said forks, pallet supporting members pivotally mounted on said members in such a way that each of said pallet supporting members rotates between a retracted position out of said path of movement and an extended position in said path, in their extended positions said supporting members cooperating to support a pallet in said path at a predetermined level, and means to bias said members from said retracted positions to said extended positions, said members being displaced against said bias from their extended positions to their retracted positions by a pallet moving upwardly from below said level to a position above said level.

8. A device according to claim 7 wherein said upright supporting members have a stop element underlying each of said supporting members to determine the extended position thereof, said device including a spring bias for each of said supporting members to urge said member toward said extended position, said member being pivoted upwardly from said stop element into its retracted position by upward movement of a pallet in said path.

9. In combination, a pallet exchange device, and a fork truck having a pair of vertically spaced apart forks connected in fixed relationship to be raised and lowered in unison; said device comprising a plurality of upright stationary members defining therebetween a vertical path of movement for loaded and unloaded pallets, pallet supporting members mounted on said stationary members for movement between extended positions in said path of movement at a common level for supporting one of said pallets, and a retracted position out of said path, said supporting members being biased toward said extended positions, levers located at a position higher than the level of said pallet supporting members by a distance less than the vertical spacing between said pair of forks, said levers being mounted on said stationary members and each having a part to be displaced into or out of said path, connecting means having a plate for each supporting member, said plate being vertically guided by a stationary member, said connecting means adapted to engage both said levers and said supporting members so as to be displaced when said lever parts are engaged by a pallet being raised by the lower of said pair of forks and caused to move upwardly, and operable to displace said pallet supporting members to their retracted positions and latch said supporting members so that they remain in said retracted positions, said lever parts when moved downwardly by a pallet being lowered by the upper of said pair of forks, displacing said connecting means to unlatch said supporting members and allow them to return to their extended positions.

10. In combination, a pallet exchange device, and a fork truck having a pair of vertically spaced apart forks connected in fixed relationship to be raised and lowered in unison; said device operable to support a loaded pallet and to permit an unloaded pallet carried by the lower of said pair of forks to be exchanged with said loaded pallet which may be carried away by the upper of said pair of forks, said device comprising a plurality of upright stationary members disposed on both sides of a vertical path of movement of the pallets carried by said forks, pallet supporting members pivotally mounted on said members in such a way that each of said pallet supporting members rotates between a retracted position out of said path of movement and an extended position in said path, in their extended positions said supporting members cooperating to support a pallet in said path at a predetermined level, and means to bias said members from said retracted positions to said extended positions, said members being displaced against said bias from their extended positions to their retracted positions by a pallet moving upwardly from below said level to a position above said level.

* * * * *